March 26, 1974    F. S. LOVE    3,799,845
BEER DISTILLATION
Filed July 6, 1971

INVENTOR
FRED S. LOVE
BY
Sol B Wicjer
ATTORNEY

3,799,845
BEER DISTILLATION
Fred S. Love, Newton Lower Falls, Mass., assignor to The Badger Company, Inc., Cambridge, Mass.
Filed July 6, 1971, Ser. No. 159,842
Int. Cl. B01d 3/22
U.S. Cl. 203—99     4 Claims

ABSTRACT OF THE DISCLOSURE

Beers having adhesive solids tending to deposit and block the interstices of ordinary sieve trays are distilled in a column still with easy two-way gas and liquid flow by using perforated plates having perforations exceeding one-half inch in diameter evenly distributed in a pattern throughout the tray surface to provide a normal low pressure drop.

---

This invention relates to improved alcohol stripping from beer and improved tray construction for a continuously operated column for stripping alcohol from beer.

More particularly, the invention relates to a method of beer stripping using an improved sieve type of tray in a continuous beer distillation column in which the perforated tray has large, evenly distributed holes, exceeding about one-half inch in diameter for dual passage of vapors and liquids in both directions. This tray construction allows easy low pressure drop passage of vapors and liquids through each distillation stage while avoiding accumulation and clogging of the trays with solids suspended in the beer.

In continuous column still operation to distill beer containing the usual suspension of fine residual solids of fermented mash, it is customary to use sieve trays ordinarily having screen mesh openings of less than about three-eighths inches in diameter, such as in a total range of about one-quarter to three-eighths inches. Such sieve trays are fitted with downcomers to convey the beer and suspended solids downward from tray to tray, while the upward surge of vapors passes through such perforations and are contacted by the descending beer and suspended solids, usually without undue clogging of the trays by accumulated solids. Operating in that manner, ordinary sieve trays, as described, most often function adequately to maintain the trays relatively clean over reasonably long periods of continuous operation of the column still. It is found, however, that where the grain has been cooked for substantially long periods, or at excessive temperatures, and particularly where the cooking of the grain has been continuous, as in continuous cooking processes, such cooking has converted the grain solids to a form which, even after fermentation, produces solids in suspension in the fermented beer of a character which tended to clog such ordinary sieve trays. The solid particles seem to be of a cohesive character which manifests itself in the accumulation of large quantities of solids as an impenetrable sludge coating upon the tray, and in the openings, thus ultimately blocking downcomer outlets and tray openings and the operation of the still.

According to the present invention, I have found that if a sieve tray to be used in such beer distillation is formed with fewer, but larger perforations and without downcomers, whereby to provide approximately the same pressure drop per tray, the larger perforations allow dual passage of vapors and liquids. The latter include suspended solids therein and both vapors and liquids pass simultaneously upward and downward through the larger perforations. The liquids satisfactorily contact the vapors for good rectification, and the tray operates quite satisfactorily without downcomers and without undue clogging over long periods of continuous use.

I have found that a tray without downcomers and having perforations of about five-eighths inches in diameter, and preferably about three-quarters to seven-eighths inches in diameter, and ranging up to a practical maximum of about two inches in diameter, operates quite well continuously and without clogging with beer solids over long periods of operation in a column still. Such trays have the perforations evenly distributed in a pattern over the surface of the plate and the perforations are present in number to provide a normal pressure drop of less than about 2 mm. Hg and preferably less than about 1.4 mm. Hg per tray. The liquid containing suspended solids and vapors pass through the same perforations both up and down in a dual flow with a usual low pressure drop per tray and allowing good alcohol vapor rectification. The net effect is that a relatively pure alcohol and water vapor mixture passes upward from tray to tray to a point near the top of the still where, after the vapors and their condensed liquids have been freed of suspended solids, the rectification is completed in a final distillation through ordinary upper bubble cap trays. The solids continuously descend from tray to tray and accumulate in a slurry at the bottom of the still which is drawn off continuously or intermittently as it accumulates.

The invention is further described with reference to the drawings wherein:

FIG. 1 diagrammatically shows a column still in combination with both a cooking stage and a brewing stage to form a beer containing finely-dispersed suspended solids in elevation;

Figure 1:
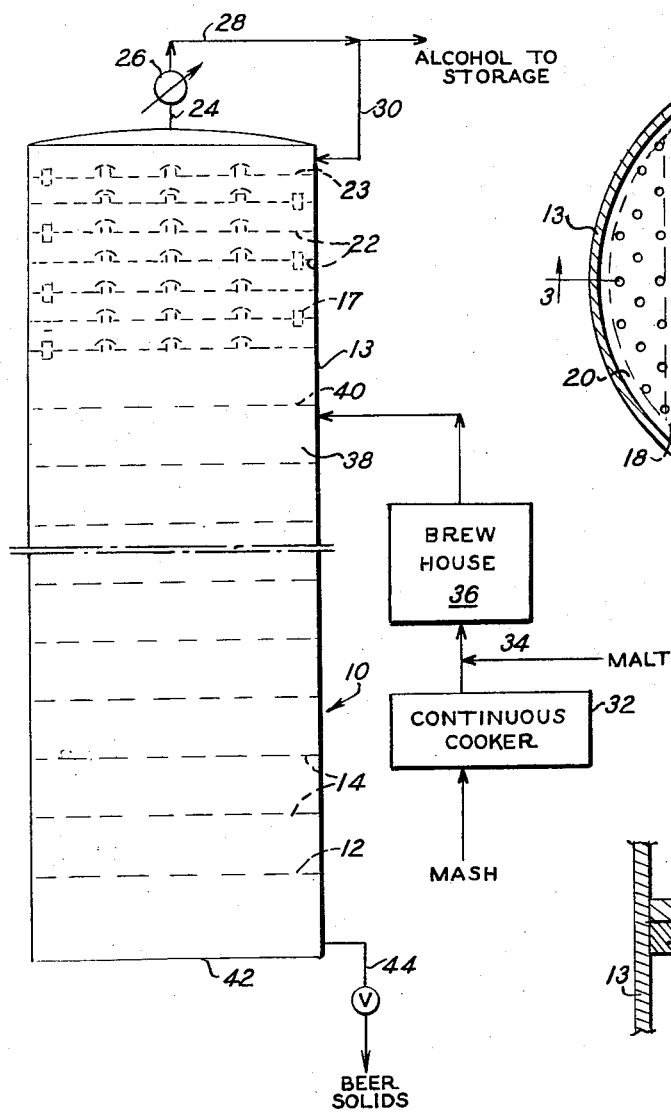

Referring first to FIG. 1, a column still 10 is formed for about three-quarters of its height into numerous distillation stages 12 comprising the sieve trays; for instance, fifteen to thirty trays arranged in a tier comprising the lower portions of the body of the still.

Figure 2:
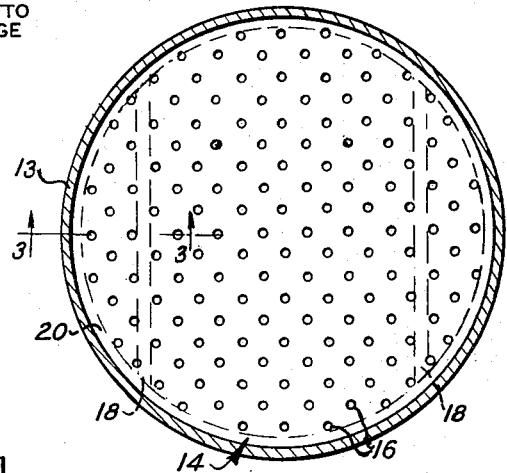
FIG. 2 is a detail showing a perforated dual flow sieve type tray in plan.
Figure 3:
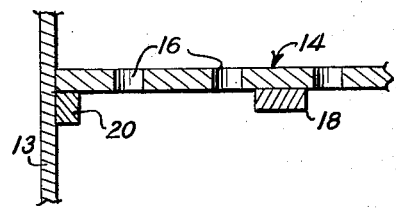
FIG. 3 is a fragmentary sectional view detail of the tray of FIG. 2 taken on the line 3—3.

Each of the trays comprise a flat plate 14 which, as shown in detail in FIGS. 2 and 3, have evenly distributed perforations 16 therethrough. The trays may each be further supported horizontally upon metallic beams 18 extending diametrically or as chords across the bottom of each tray for reinforcing firm support to maintain each plate 14 horizontal at its level of the still. Each tray is suitably supported upon an annular ring 20 secured to the annular wall 13 of the still and fixed in place upon the annular ring 20 by suitable means such as clamps (not shown).

Each of the perforations 16 are substantially evenly sized and evenly distributed in a pattern throughout the flat plates 14 in number to provide a low pressure sieve tray drop of less than about 2 mm. Hg per tray, and usually less than about 1.4, most usually in the range of .8 to 1.3 mm. Hg.

The upper part 17 of the column 10 has a series of ordinary bubble cap trays 22 disposed in the upper one-quarter of the column, and operative for simple rectification of the aqueous alcohol vapors and liquids which at this point are free of suspended beer solids. The alcohol vapors pass overhead through line 24 and are cooled in a condenser 26, and the alcoholic liquid is withdrawn from the system to storage through a line 28. A portion of the liquid condensate may be returned through line 30 as reflux, being introduced into the column for this purpose to the upper bubble cap plate 23.

For treatment of the mash, the cleaned cereal grain is milled and then continuously cooked in a water suspension in continuous cookers such as described in Chemical & Metallurgical Engineering, October 1944, pps. 142–145, such cooking process being incorporated here by reference. The cooking, as described, is effected by heating of a slurry of the milled grain in water to 122° F. to 160° F. as described, and then rapidly heated with steam to a cooking temperature of 350° F. to 360° F. for a period of sixty to seventy seconds, while passing through a series of pipes, to complete the cooking at that high temperature, after which the cooked mash is instantaneously cooled to 145° F. in a vacuum flash chamber (not shown). That commercial operation is shown in FIG. 1 as continuous cooker 32.

Meanwhile, barley malt equivalent to approximately eight percent of the total grain is weighed, metered and milled as described above. The malt is mixed with a stream of water at 145° F. in a mixing vessel, where the malt enzymes in fuse into the water for a period of two minutes. This malt mash is then pumped into the main mash stream, and the mixture goes through pipelines to the coolers and fermenters in the brew house 36, by way of line 34, where it is brewed under conventional conditions, the fermented beer containing the usual cooked, fermented and residual suspended solids being passed to an upper sieve tray at the intermediate position 38 of the same structure as the trays. A foam tray 40 immediately below the bubble cap plates 22 serves the purpose of allowing foam separation, the beer feed to the column being introduced into an intermediate upper sieve tray 38.

The beer and suspended solids therein descend through the tray perforations from tray to tray, countercurrent to rising vapors and entrained foam. The vapors and liquid containing suspended solids pass through the same perforations in both directions. The solids ultimately descend the column from stage to stage, collecting in the lowermost chamber 42 and are withdrawn for disposal through line 44. The column is heated in the conventional manner, not shown.

The following example illustrates the practice of this invention:

EXAMPLE

In practical operation of a normally operating beer still as described, in which the column has twenty-six sieve trays with a screen mesh size of ⅜ inch in diameter and with a pressure drop of 0.90 mm. Hg per tray, and an upper stage of eight bubble cap trays, an overhead distillate of about 70 to 85 percent by volume alcohol can be obtained in continuous distillation. Where a beer formed by grain fermentation in which the grain was cooked batchwise before malting to a temperature of about 300° F. with steam is processed, the still would operate indefinitely such as a several-week period, without clogging; such solids being readily washed through the downcomers and through the sieve openings. Where, however, the grain has been continuously cooked first at a temperature of 150° F. and then by steaming for one minute at 350° F., as described in the above-identified publication, after which the cooked grain is malted and fermented, the still will be clogged with suspended solids after operation for a period of only three to four days. With the same continuously cooked grain, and using the same beer as feed, but substituting the same number of sieve trays in which the holes are ¾ inch in diameter distributed evenly, and in such number as to provide the same pressure drop per tray and without downcomers, the column operated continuously for several weeks without clogging and produced the same quality of alcohol.

Certain modifications as known in the art for variation of column structure, fermentation procedures, and cooking of grain to form a cohesive type of solid which tend to clog a still, can be substituted for the present process.

Other modifications of the trays as known in the distillation and sieve tray arts, but incorporating the present principle of using perforated trays with large perforations, evenly distributed in a number to allow a pressure drop of usually less than 2 mm. Hg per tray, may be substituted.

What is claimed is:

1. In the distillation of a beer containing fermentation solids of a character tending to clog the interstices of sieve trays of a column still, the improvement comprising distilling said beer in a multi-sieve tray distillation column wherein the sieve trays are perforated flat-surfaced plates free of downcomers and having large perforations sized in the range of about one-half to two inches in diameter, said perforations being evenly distributed in a pattern across the plates in number to provide a pressure drop not exceeding about 2 mm. Hg per tray, whereby the distillation vapors simultaneously pass upward and the liquid beer containing said solids passes downward in a countercurrent flow through said perforations in said trays.

2. The method as defined in claim 1 wherein the column is made up of sieve trays at the lower end thereof and, at a point above the level at which solids tend to be deposited on the tray, the column continues as ordinary bubble cap trays in which rectification of alcohols is completed.

3. The method as defined in claim 1 wherein the perforations in each tray are sized in the range of about five-eighths to seven-eighths inches in diameter.

4. The method as defined in claim 1 wherein the grain forming suspended solids in the beer feed is continuously cooked before fermenting.

References Cited

UNITED STATES PATENTS

| | | | |
|---|---|---|---|
| 2,358,272 | 9/1944 | Willkie | 99—34 |
| 3,143,482 | 8/1964 | McLeod et al. | 202—158 X |
| 2,767,966 | 10/1966 | Chave | 202—158 X |
| 2,767,967 | 10/1956 | Hutchinson | 202—158 X |
| 2,581,881 | 1/1952 | Pyle et al. | 202—158 X |
| 2,707,164 | 4/1955 | Muller et al. | 99—34 |

FOREIGN PATENTS 2,027,655   1/1971   Germany.

NORMAN YUDKOFF, Primary Examiner
D. EDWARDS, Assistant Examiner

U.S. Cl. X.R.
426—14; 202—158